No. 697,162. Patented Apr. 8, 1902.
O. O. OZIAS.
WEIGHING SCALE.
(Application filed Nov. 11, 1897.)
(No Model.)
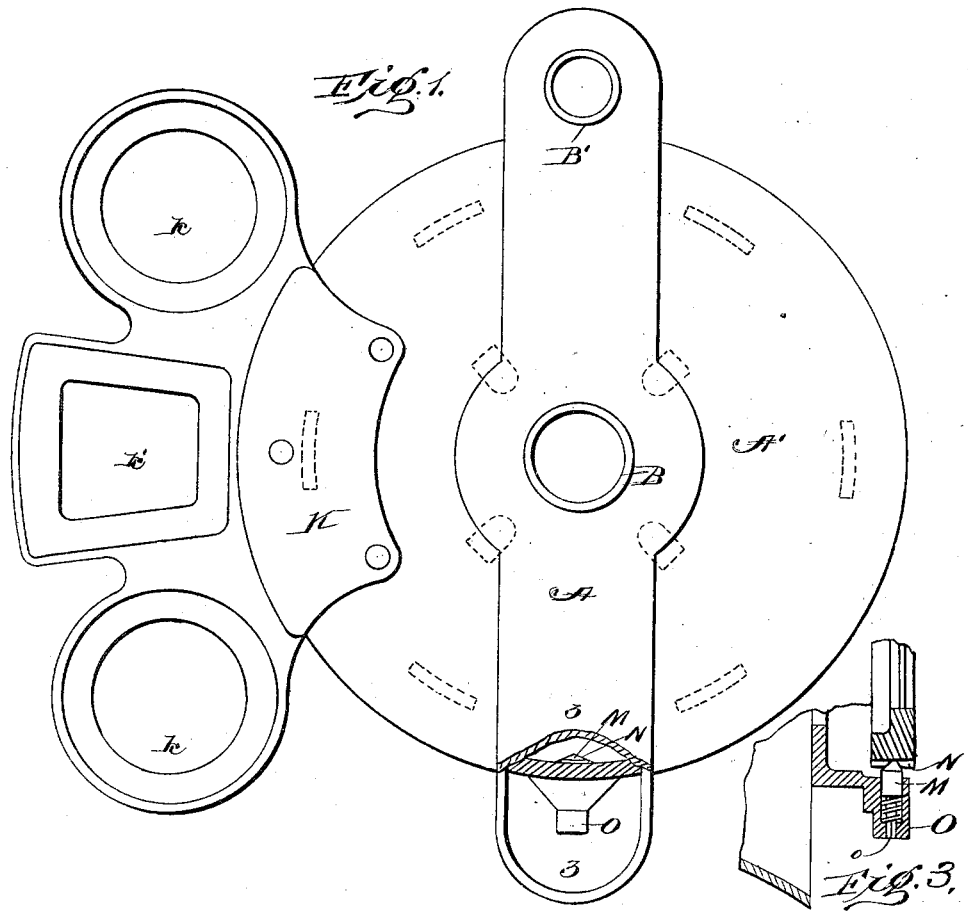
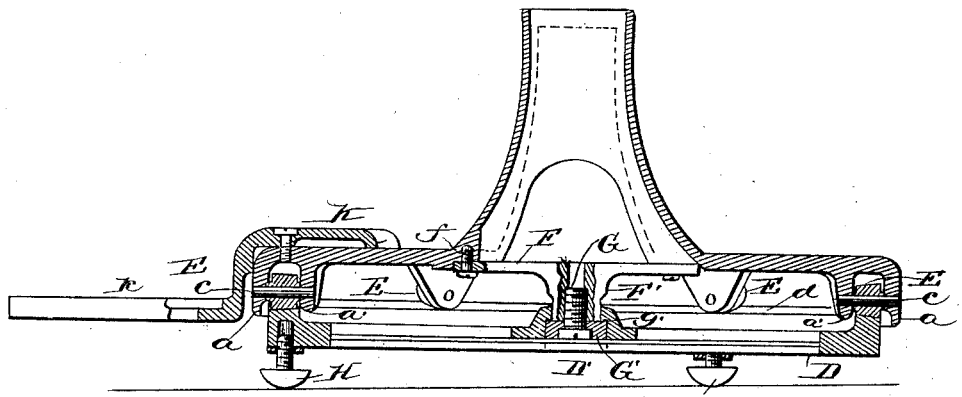
Witnesses:
Inventor:
Orange O. Ozias

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

WEIGHING-SCALE.

SPECIFICATION forming part of Letters Patent No. 697,162, dated April 8, 1902.

Application filed November 11, 1897. Serial No. 658,167. (No model.)

*To all whom it may concern:*

Be it known that I, ORANGE O. OZIAS, a citizen of the United States, residing at Dayton, in the county of Montgomery and State of Ohio, have invented certain new and useful Improvements in Weighing-Scales; and I do hereby declare the following to be a full, clear, and exact description of the same, reference being had to the accompanying drawings, forming a part of this specification, and to the letters of reference marked thereon.

This invention relates to improvements in weighing-scales, especially to that class of scales known as "counter-scales." In scales of this type as heretofore constructed considerable inconvenience has been occasioned by the fact that it was impracticable to move said scales around into convenient position for the person operating the same or to expose the reading graduations properly to the light, which in most stores enters from one end or the other of the room. For instance, where the scales have been located on the counter it has heretofore been necessary, or at least most convenient, for the storekeeper to always handle the scales at a point behind the counter, and this necessitates in many instances a trip from in front of the counter to the position back of the counter in order to weigh any goods which might be located at the front. So, too, while under ordinary circumstances the light might be sufficient to permit of the graduations on the beam or computing member, where the scale is a computing-scale, to be read when the scale is placed squarely on the counter, yet on dark days it would be almost impossible to read the graduations with the scale in this position. Furthermore, even where the scales are light enough in weight to permit of their being shifted about on the counter the difficulty of preserving them in their proper adjustment when so shifted is always encountered, for, as is well known, the scales to be accurate should always be operated when the base is level or when the parts have been adjusted to accommodate a certain irregularity in the level of the base or support upon which the scales are mounted—the top of the counter, for instance. This difficulty makes it impracticable to shift the scales about; and the present invention has for its object to provide a construction of scale wherein the operative parts of the scale itself may be turned about conveniently, so as to present the front of the scale to either side of the counter or to the light side of the store and without in any wise affecting the adjustment of the scale or in any wise interfering with the proper manipulations of the scale.

With these objects in view, then, the invention may be said to consist in a scale having a "subbase," so to speak, which may be leveled upon the counter or other support, and in a corresponding scale-base with a circular track, and antifriction-rollers interposed between the base and subbase, upon which the scale may be turned, so as to present its proper side to any point of the compass without in any wise affecting the adjustment of the parts.

The invention further consists in connecting the base and subbase in such manner that the parts will not become separated when the scale is lifted or transported from place to place, and, further, in providing on the base of the scale, so as to be turned with said base, a suitable support for the supplemental weights, whereby said weights are always located in proper position relative to the front of the scale so as to be conveniently reached regardless of the position of the scale.

The invention further consists in providing a check for retarding the movement of the base upon the subbase, whereby its too-free movement is prevented and the parts are held with sufficient rigidity at any position of adjustment to permit of the use of the scale without danger of its being turned in such use.

Referring to the accompanying drawings, Figure 1 is a top plan view of a scale-base embodying my present invention with a portion broken away to illustrate underlying parts, the form of scale to which the base is adapted being fully shown and described in my prior patent, No. 581,172, dated April 20, 1897, and being of what is known as the "even-balance" type, although in the application of the present invention it is not my intention to limit the invention to any particular type of scale. Fig. 2 is a section taken transversely of Fig. 1 on a central vertical plane. Fig. 3 is a detail section on the line 3 3, Fig. 1, showing the lock or retainer for holding the scale-base in its adjusted position.

Like letters of reference in the several figures indicate the same parts.

The scale-base proper, which is lettered A in the accompanying drawings, is provided with a central post B and end posts B' for the accommodation of the pivots and uprights of the pivoted beam or members constituting the main working parts of the scale, the type of scale selected for illustration being, as before stated, similar to that fully shown and described in my said prior patent and will not, therefore, be further referred to herein. The said scale-base A is further provided with a substantially flat and preferably circular lateral extension A', constituting, with the part A, what may be termed the "scale-base proper." This scale-base A A' is provided around its edge with a downwardly-extending flange $a$, and beneath it I locate the subbase D, which subbase D is provided with a circular track or way $d$, upon which antifriction-rollers E, journaled in the scale-base A', are adapted to travel. The journals for these antifriction-rollers (lettered $e$) are preferably supported at one end in the flange $a$ and at the opposite end in lugs $a'$, arranged parallel with the flange $a$ on the inner side of the base A. The subbase D may be in the form of a spider or substantially flat frame, and at the center D' it is provided with a pivotal connection with the scale-base A A'. In the preferred form the scale-base is provided at its center of rotation with a spider or frame F, which may be secured in place by screws $f$ and is provided with a downwardly-extending hub or boss F', up into which a screw G, passing through the subbase D D', is adapted to screw, thereby uniting the parts and at the same time permitting the scale-base to rotate freely and independently of the subbase.

To insure a firm union without danger of the screw becoming loosened in use, the hub F' may extend down through the upper portion of the subbase at D and the screw G be employed to fasten an enlargement G' upon this hub F', which enlargement taking beneath a shoulder $g'$ fastens the two parts together securely and holds them against separation or lateral movement.

The subbase D is adapted to be leveled up upon the counter or other support, and when so leveled it is obvious that the rotation of the scale-base thereupon will in no wise throw the scale proper out of its horizontal position, and hence there is no danger of the parts being thrown out of adjustment by such rotation. Any ordinary means may be employed for leveling up the subbase; but I prefer to embody with said subbase a means which will be independent of the counter or support and which will go with and form a part of the subbase—such, for instance, as the screws or adjustable feet H—which may be screwed into the subbase a greater or less distance to compensate for any inequalities in the counter or support and bring the subbase to a proper level.

In the form shown the scale-base is provided at one side with a projection or shoulder K, carrying receptacles $k$ $k'$ for the supplemental weights to be used in connection with the scale. This arrangement of mounting the support for the supplemental weights on the scale-base, so as to be movable around the center therewith, it will be observed, maintains the relative positions of the scale and weights, whereby the storekeeper always has said weights where he can at once lay his hand upon them without even looking at the weights to ascertain if they are correct, as storekeepers, as a rule, become so familiar with weights that if they are in their proper positions relative to the scale they know at once whether they have the correct weight in hand.

Inasmuch as there is some little danger of the scale turning when being used if mounted upon a subbase in this manner, I prefer to provide a retainer for holding the scale-base in any position to which it may be adjusted, which retainer, however, will be released when sufficient pressure is applied tending to turn the scale in either direction. In the preferred form this retainer (see Figs. 1 and 3) consists of a spring-pressed bolt M, having a conical end adapted to enter recesses or apertures N in the subbase. The bolt M is mounted in the housing O in the scale-base and is advanced, preferably, by a coiled spring $o$.

Obviously any preferred form of retainer or lock may be employed, but that shown is preferred, inasmuch as it is simple and not liable to be disarranged or interfered with by meddlesome persons.

It will be observed that so far as the appearance of the scale is concerned the addition of the subbase with the intermediate parts for permitting the scale to be turned around upon the subbase does not alter the appearance of the scale to an appreciable extent and for all practical purposes would not lead one to suppose that it was other than an ordinary scale. Thus while the advantages of the present invention are secured the structure is practically concealed from view and does not tend to further complicate the appearance of the scale.

The stationary part or subbase is of less diameter than the least diameter of the scale-base, or, in other words, the scale-base overhangs the subbase and conceals the same from view.

Having thus fully described my invention, what I claim as new, and desire to secure by Letters Patent, is—

In an apparatus such as described, the combination with a subbase made in the form of a flat spider, vertically-adjustable feet arranged around the periphery of said spider and a peripheral track on its upper surface, of a scale-base having a flange extending down around the periphery of said subbase, a series of antifriction-rollers arranged between the scale-base and a track on the subbase, a screw centrally connecting the subbase and scale-base and constituting a pivot about which the scale-base may travel and whereby the separation of the two is prevented, a series of notches on the subbase and a movable projection on the scale-base coöperating with said notches to hold said parts against accidental relative displacement.

ORANGE O. OZIAS.

Witnesses:
ISSAC G. KENNEDY,
CHARLES W. JAMES.